Jan. 18, 1944.   M. P. McCARTY   2,339,713
TESTING DEVICE FOR IGNITION SYSTEMS
Filed May 12, 1941
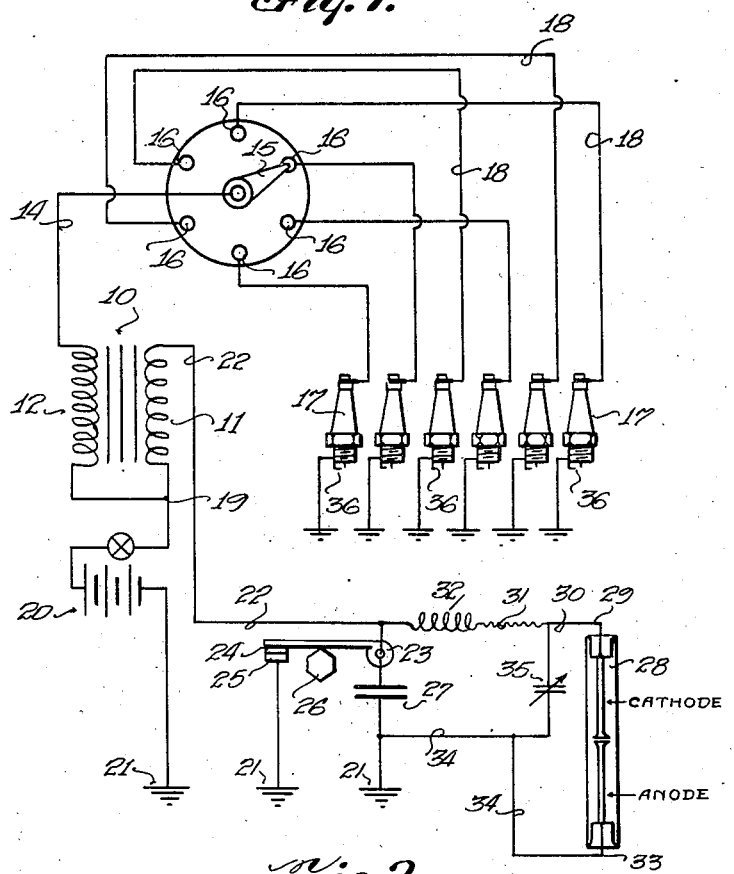
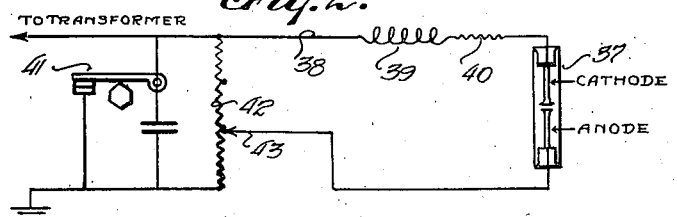
MADISON P. McCARTY
INVENTOR.
BY
ATTORNEY Patented Jan. 18, 1944

2,339,713

UNITED STATES PATENT OFFICE 2,339,713

TESTING DEVICE FOR IGNITION SYSTEMS

Madison P. McCarty, Dallas, Tex., assignor of one-half to John B. Donovan, Dallas, Tex.

Application May 12, 1941, Serial No. 393,039

2 Claims. (Cl. 175—183)

This invention relates to testing devices for the ignition system of internal combustion engines and it has particular reference to apparatus effective to visibly indicate the condition of the spark plugs, condenser and other electrical units in the ignition circuit.

The principal object of the invention is to provide an instrument comprised of an electric circuit including a choke coil and resistance in series with a neon tube, the arrangement being such that the behavior of the tube will afford a visual indication of the resistance at the spark gap, that is to say, the variance in electrical resistance at the spark gap of an engine spark plug, due to compression differentials, will become immediately apparent for correction.

Another and equally important object of the invention is to provide an instrument of the character set forth which when connected across the breaker points, in multiple with the condenser of the ignition system, will disclose the condition of the condenser. On the other hand, in the event other factors such as defective breaker points, discharged battery, defective saturation of the windings of the transformer, are instrumental in the faulty performance of the system, these conditions likewise are determined by the use of the invention.

Another object of the invention is to provide an instrument which consumes no appreciable amount of current from the circuit under test. Consequently, its value as a constant indicator of the performance of airplane motor ignition systems in flying is obvious. Moreover, the instrument employs a gas-filled tube of a low striking voltage preferably of the anode-cathode type which utilizes the discharge or stored-up energy from the condenser in the system, to effect gradient illumination of the cathode and the degree of which illumination indicates applied voltage.

Still another object of the invention is to provide for the determination of the fuel mixture, that is, whether the percentage of fuel and air is in proper ratio. In addition to these objects, the invention enables tests to be made on the road and in the air as well as in service stations.

With the foregoing objects as paramount, the invention has further objects to accomplish which a novel structure is provided, an embodiment being illustrated in the accompanying drawing, wherein:

Figure 1 is a schematic wiring diagram of the invention, shown as being connected in multiple with the interrupter points of a conventional engine ignition system, and Figure 2 is a schematic wiring diagram of a slightly modified form of the invention.

Electrical apparatus for visually determining the operative condition of electrical systems wherein electrically excitable gas-filled tubes are employed are, of course, well known. However, the behavior of the tubes in such apparatus range from erratic illumination to a steady, intermittent glow to indicate deficiencies or defectiveness of the units of a system such as poor breaker point contacts, weak battery and the like. The present invention accomplishes, through the medium of a cathode-anode type of electronic discharge tube, a more definite observation of the behavior of the system under test by reason of the illuminative gradient reflected on the electrodes, deficiencies of the system being revealed by the degrees of illumination on the anode while the illumination on the cathode indicates proper performance of all of the units of the system. However, in cases where the faults in a system under test are of a serious nature, or where the capacity of the condenser of such system is to be determined, the cathode itself will reflect these conditions. For example, the anode of the tube will indicate, by reason of back-up current from the condenser, varying resistances at the spark-plug gaps, due to variances in compression. On the other hand, the cathode definitely shows by varying degrees of illumination the relative capacity of the condenser as well as any deficiencies in the charge or discharge of the condenser and improper or defective contacts between the interrupter points.

Continuing with a more detailed description of the drawing, Figure 1 illustrates a conventional ignition system of an internal combustion engine, wherein is provided the coil 10 having the usual primary winding 11 and secondary winding 12. The secondary winding is connected to the center post 13 by wire 14. The distributor rotor 15 engages successively the contacts 16 which are in turn connected to the spark plugs 17 through secondary wires 18. The secondary winding is grounded at 19 through circuit of battery 20, which in turn, is grounded at 21.

The primary winding 11 of the ignition coil is connected by means of wire 22 to the breaker arm 23, whose contact 24 engages the stationary breaker point 25, grounded at 21. The conventional cam 26 actuates the breaker arm 23. The condenser 27 is connected across the breaker points and is grounded also at 21.

The present invention consists of an anode-cathode tube 28 whose negative terminal 29 is connected to the breaker arm 23 by means of wire 30 through resistance 31 and choke coil 32. The positive terminal 33 of tube 28 is connected through wire 34 to the ground 21 of the condenser 27.

A variable condenser 35 of preferably small capacity is connected across the terminals of the anode-cathode tube 28 and serves to shunt the permissible leakage common to the average paper dielectric condenser and also functions to increase the sensitivity of the tester to govern the effectiveness of the illumination of the electrodes.

In operation, with the wires 30 and 34 connected in multiple across the condenser 27 of the conventional ignition circuit, as shown, discharge of the condenser through the primary winding 11, this current being directly opposite to the flow of current to battery 20 demagnetizes the iron core of the ignition coil and thus produces an extremely high electromotive force in the secondary winding 12 of the coil. First, the electromotive force of self-induction establishes the current that charges the condenser. When the condenser discharges at the opening of the breaker points, the voltage of discharge is sufficiently high to overcome the opposing electromotive force of the battery and to force an instantaneous current through the primary winding 11 of the ignition coil and the battery 20, against the resistance of these parts.

This current reduces the magnetism of the core of the ignition coil to zero almost instantaneously, thus producing the maximum induction in the secondary coil 12. The condenser discharges current or voltage when all factors in the system are in proper working order, and effects ionization of the gases and illuminates the cathode or negative electrode of the tube 28. So long as the system remains in good operating condition, the cathode or negative electrode remains fully illuminated.

Any resistance set up in the primary circuit such as may be due to faulty breaker point contacts, low battery voltage, defects in the coil and the like will cause a fall in the illuminative gradient of the cathode electrode, the degree or intensity of the glow varying in accordance with applied voltage or general condition of this circuit. The reason for the behavior of the cathode as described is due to restriction of current flow through the primary 11 of the coil set up by resistance caused by improper breaker point contact, shorted turns in the primary winding and like defects. Self-inductance charging the condenser being reduced by these resistances and other factors restricts the amount of current flowing to the condenser 27 and this directly affects the cathode by limiting the energizing current thereto, consequently producing only a partial illumination.

Indications of improper spacing of the spark plug gaps 36 of spark plugs 17 or other irregularities in the secondary circuit are reflected by the behavior of the anode electrode of the tube 28.

When the points of breaker open, the condenser is charged and immediately discharges in a reverse direction through the primary of the coil and since the current flow through the primary of the coil is effected by the current being taken off the secondary of the transformer, the condition of the secondary circuit thereby affects the primary current in the coil by varying the current taken from the secondary. Therefore, the resistance of spark plug gaps affected by the gap setting, also by the cleanliness of insulator surfaces or the compression of cylinder, which also affects the resistance across spark plug gaps. All have a modifying effect on the amount of current which flows from the secondary of transformer thereby varying the amount of current flowing in the primary of the transformer or coil.

If this variation in the primary current is of sufficient magnitude, the anode 33 of tube 28 is also illuminated and such illumination takes place also due to faulty conditions in the primary circuit connected to primary of coil as well as those in the secondary.

The cause of this anode illumination is due to the fact that when defects in either the primary or secondary circuits are sufficiently severe to cause the collapsing effect of the flux in the core of the transformer to be slow, the condenser 27 receives a charge back in the opposite direction from which it originally discharged through primary 11 when the breaker 23 opened. This reverse charge into the condenser represents one of the first few oscillations of the condenser charge and discharge which is known to be of oscillatory nature, the voltage of the successive charges and discharges decreasing as the oscillations proceed.

It is obvious from the foregoing that the peculiar behavior of one or the other or both of the electrodes of the tube provide a definite indication to one skilled in the art as to the performance or lack of performance of an ignition system as well as a signal as to what factor in the system is faulty to render the same ineffective.

In Figure 2 is shown a modified form of the circuit illustrated in Figure 1, although the same type of tube 37 is employed having anode-cathode electrodes, as shown.

In this form of the invention, the circuit 38, containing the choke 39, resistance 40 and tube 37, is connected in multiple across the points of the interrupter 41, with the resistor 42 connected in multiple therewith. The anode of tube 37 is connected to a movable contact arm 43 by means of which the amount of resistance shunted across tube 37 may be varied at will. The value of this variable resistance is to adjust or balance the voltage across tube 37 in accordance with the characteristics of the various ignition systems or circuits to which the device may be connected for testing purposes. The behavior of the tube 37 is substantially the same as in the preceding case, that is, the electrodes vary in illuminative intensity or gradient depending upon the nature of the defect in the ignition circuit. The movable contact arm 43 serves the same purpose in the modified circuit as the condenser 35 in the first described circuit.

The function of the choke coil 39 is to limit undesirable radio frequencies and the resistance 40 is to introduce sufficient resistance in the circuit so the forced oscillations are reduced in the tube circuit, as in the preceding case.

Manifestly, the construction as shown and described is capable of some modification and such modification as may be construed to fall within the scope and meaning of the appended claims is also considered to be within the spirit and intent of the invention.

What is claimed is:

1. In an apparatus for testing the ignition circuit of internal combustion engines, a tube circuit arranged to be connected with the primary circuit of said ignition circuit, a tube containing electrically excitable gases and having anode and cathode electrodes jointly and individually illuminated upon ionization of said gases by electronic action set up in said tube by the action of said ignition circuit, the intensity and gradient of said illumination on either of said electrodes being determined by the fluctuations of current flow in said ignition circuit and a condenser in the primary of said ignition circuit whose oscillatory discharge excites the gases of said tube, a variable condenser in parallel with said tube for controlling said oscillatory discharge, and resistance means in said tube circuit for limiting undesirable radio frequencies and to introduce into said tube circuit a resistance to reduce forced oscillations therein.

2. In an apparatus for testing the efficiency of the elements of the ignition system of an internal combustion engine, an anode-cathode tube, a tube circuit connected in the low tension circuit of said system whereby the electrodes of said tube will cooperatively and individually indicate normal and abnormal conditions of the elements of said system, a choke coil in said tube circuit for minimizing undesirable radio frequencies, a condenser in the primary circuit of said ignition system whose oscillatory discharge effects illumination of the gases of said tube, a variable condenser in parallel with said tubes for controlling the oscillatory discharge and resistance means in said tube circuit for reducing forced oscillations therein.

MADISON P. McCARTY.